United States Patent
Geronimi (10) Patent No.: US 11,015,127 B2
(45) Date of Patent: May 25, 2021

(54) CONTINUOUS REFLUX REACTOR UNDER PRESSURE AND CONTROLLED CONDENSER SYSTEM FOR THERMOCHEMICAL TREATMENT OF PLASTIC AND/OR ELASTOMERIC WASTE

(71) Applicant: VALGROUP S.A., Luxembourg (LU)

(72) Inventor: Lucas Salim Geronimi, Lorena (BR)

(73) Assignee: VALGROUP S.A., Luxembourg (LU)

( * ) Notice: Subject to any disclaimer, the term of this patent is extended or adjusted under 35 U.S.C. 154(b) by 0 days.

(21) Appl. No.: 16/922,491

(22) Filed: Jul. 7, 2020

(65) Prior Publication Data

US 2021/0062093 A1  Mar. 4, 2021

Related U.S. Application Data

(60) Provisional application No. 62/895,613, filed on Sep. 4, 2019.

(51) Int. Cl.
*C10G 1/10* (2006.01)
*B01J 6/00* (2006.01)

(52) U.S. Cl.
CPC .............. *C10G 1/10* (2013.01); *B01J 6/008* (2013.01); *C10G 2300/1003* (2013.01)

(58) Field of Classification Search
CPC ..... C10G 1/10; C10G 2300/1003; B01J 6/008
See application file for complete search history.

(56) References Cited

U.S. PATENT DOCUMENTS 3,813,890 A   6/1974  Bligh
3,885,933 A * 5/1975  Putney ............... B01D 45/12
                                                         55/397
4,250,158 A * 2/1981  Solbakken ............ C10B 53/07
                                                         423/449.6
4,721,457 A   1/1988  Areaux et al.
7,185,514 B2  3/2007  Paradowski
(Continued)

FOREIGN PATENT DOCUMENTS

WO    2005/021685 A1   3/2005

OTHER PUBLICATIONS

Belgiorno, V. et al. Energy from gasification of solid wastes. Waste Management, v. 23, n. 1, p. 1-15, 2003. ISSN 0956-053X.

(Continued)

*Primary Examiner* — Thuan D Dang
(74) *Attorney, Agent, or Firm* — Jacob M. Ward; Ward Law Office LLC (57) ABSTRACT

A continuous reflux reactor and controlled condenser system for thermochemical treatment of plastic and/or elastomeric waste has five zones with different complements. The zones comprises the bottom zone, pyrolysis zone, meeting zone, reflux zone and extraction zone. The reactor uses a reflux zone to increase the production of a light oil in the process. The reflux zone is equipped with some studded tubes that enhances the contact area. Cold molten salt is used as the cooling element of this step. The pyrolysis zone, where the material will be pyrolyzed, has the differential of being equipped with molten salt coils using hot molten salt as the heating element. After the material passes to all zones, the material goes to a cyclone that will condense heavier hydrocarbons present in this step and send the light hydrocarbons to the condensers.

19 Claims, 5 Drawing Sheets

(56) References Cited

U.S. PATENT DOCUMENTS

| | | |
|---|---|---|
| 9,714,391 B2 | 7/2017 | Combs |
| 10,131,847 B2 | 11/2018 | McNamara et al. |
| 2009/0321317 A1 | 12/2009 | Widmer et al. |
| 2015/0001061 A1 | 1/2015 | Bordynuik |
| 2015/0275093 A1 | 10/2015 | Tsoi |
| 2019/0177620 A1 | 6/2019 | Posmyk et al. |

OTHER PUBLICATIONS

Basu, Prabir Biomass Gasification and Pyrolysis: Practical Design and Theory, Burlington: Ed. Elsevier, 2010.
Gao, Feng Pyrolysis of Waste Plastic into Fuels, University of Canterbury, 2010.

\* cited by examiner

CONTINUOUS REFLUX REACTOR UNDER PRESSURE AND CONTROLLED CONDENSER SYSTEM FOR THERMOCHEMICAL TREATMENT OF PLASTIC AND/OR ELASTOMERIC WASTE

CROSS REFERENCE TO RELATED APPLICATIONS

This application claims the benefit of U.S. Provisional Application Ser. No. 62/895,613, filed on Sep. 4, 2019. The entire disclosure of the above application is hereby incorporated herein by reference.

FIELD

The present disclosure relates generally to a system for thermochemical treatment waste and, more particularly, to a reflux system for thermochemical treatment of plastic waste.

BACKGROUND

Thermochemical treatment promotes the transformation of the chemical structure of raw material under high temperatures. The three main thermochemical treatment processes are combustion, gasification and pyrolysis. Each of the treatment processes have different operations and consequently generate different products. For example, the three main thermochemical treatment processes are disclosed in BELGIORNO, V. et al. Energy from gasification of solid wastes. Waste Management, v. 23, n. 1, p. 1-15, 2003. ISSN 0956-053X.

The pyrolysis process is a process of heating a fuel material at a given heating rate in the complete absence of oxygen. The pyrolysis process is often performed in the presence of a mediating or neutral gas, such as nitrogen. For example, the pyrolysis process is described in the publication BASU, Prabir Biomass Gasification and Pyrolysis: Practical Design and Theory, Burlington: Ed. Elsevier, 2010.

The products of pyrolysis may include: a) solid fraction, with generation of coal that can be used as a fuel or for energy production; b) liquid fraction, also called pyrolysis oil, which can be processed into fuels and chemical products, and c) gas fraction, with the generation of condensable gases, such as $H_2$, $CO_2$, CO, and $CH_4$.

The reactors used for the pyrolysis process is classified into batch, semi-batch and continuous, or classified based on types of reactor bed. The choice of reactor type can influence on the heat transfer rate, residence time and reflux of primary products, as described in the publication GAO, Feng Pyrolysis of Waste Plastic into Fuels, University of Canterbury, 2010.

In the batch reactor, a melt polymer may be produced by a liquefier, and then fed into the reactor, processed, and the product is removed at the end. In the semi-batch reactor, the pyrolysis product is continuously removed once they are produced, but the melt polymer is feed just once. In the continuous reactor, the reactor is continuously feed and the product is continuously removed as it is produced.

There is a continuing need for an efficient and safe continuous reflux reactor and controlled condenser system for thermochemical treatment of plastic and/or elastomeric waste. Desirably, the reactor would be able to obtain higher percentages of high quality naphtha.

SUMMARY

In concordance with the instant disclosure, an efficient and safe continuous reflux reactor and controlled condenser system for thermochemical treatment of plastic and/or elastomeric waste, which may obtain higher percentages of naphtha, has been surprisingly discovered.

In one embodiment, a system for thermochemical treatment of plastic waste includes a continuous reflux reactor, a cyclone, and a condenser system. The continuous reflux reactor is configured to receive and pyrolyze melt polymer to form gasified hydrocarbons. The cyclone is in fluid communication with the continuous reflux reactor. The cyclone is configured to refine the gasified hydrocarbons from the continuous reflux reactor. The condenser system is in fluid communication with the cyclone. The condenser system is configured to perform a controlled condensation of the gasified hydrocarbons from the cyclone to produce separate oils.

In another embodiment, a method of thermochemical treatment of plastic waste includes the steps of providing the system for thermochemical treatment of plastic. Then, heating the melt polymers in the continuous reflux reactor until the melt polymer gasifies. Next, pumping gases from the continuous reflux reactor through a flux valve to the cyclone. Then, heating the gases within the cyclone until the gases reach a pre-determined temperature and pressurizing the gases. Next, pumping the gases out of the cyclone to the condenser. Finally, cooling and condensing the gases into separate oils.

The interest of the pyrolysis process is to get the oil produced by the thermal treatment of the melt polymer, which should be a light oil, more specifically naphtha. Thus, to improve the production of naphtha, a reflux can be used to help in the condensation of the heavier hydrocarbons.

DRAWINGS

The above, as well as other advantages of the present disclosure will become readily apparent to those skilled in the art from the following detailed description, particularly when considered in the light of the drawings described hereafter.

DETAILED DESCRIPTION

The following description is merely exemplary in nature and is not intended to limit the present disclosure, application, or uses. It should be understood that throughout the drawings, corresponding reference numerals indicate like or corresponding parts and features. In respect of the methods disclosed, the order of the steps presented is exemplary in nature, and thus, is not necessary or critical unless otherwise disclosed.

As shown in FIGS. 1-4, a system for thermochemical treatment of plastic waste 100 may include a continuous reflux reactor 102, a cyclone 104, and a condenser system 106. The continuous reflux reactor 102 may be configured to receive and pyrolyze melt polymer to form gasified hydrocarbons. The cyclone 104 may be in fluid communication with the continuous reflux reactor 102. The cyclone 104 may be configured to refine the gasified hydrocarbons from the continuous reflux reactor 102. The condenser system 106 may be in fluid communication with the cyclone 104. The condenser system 106 may be configured to perform a controlled condensation of the gasified hydrocarbons from the cyclone 104 to produce separate oils.

Figure 1:
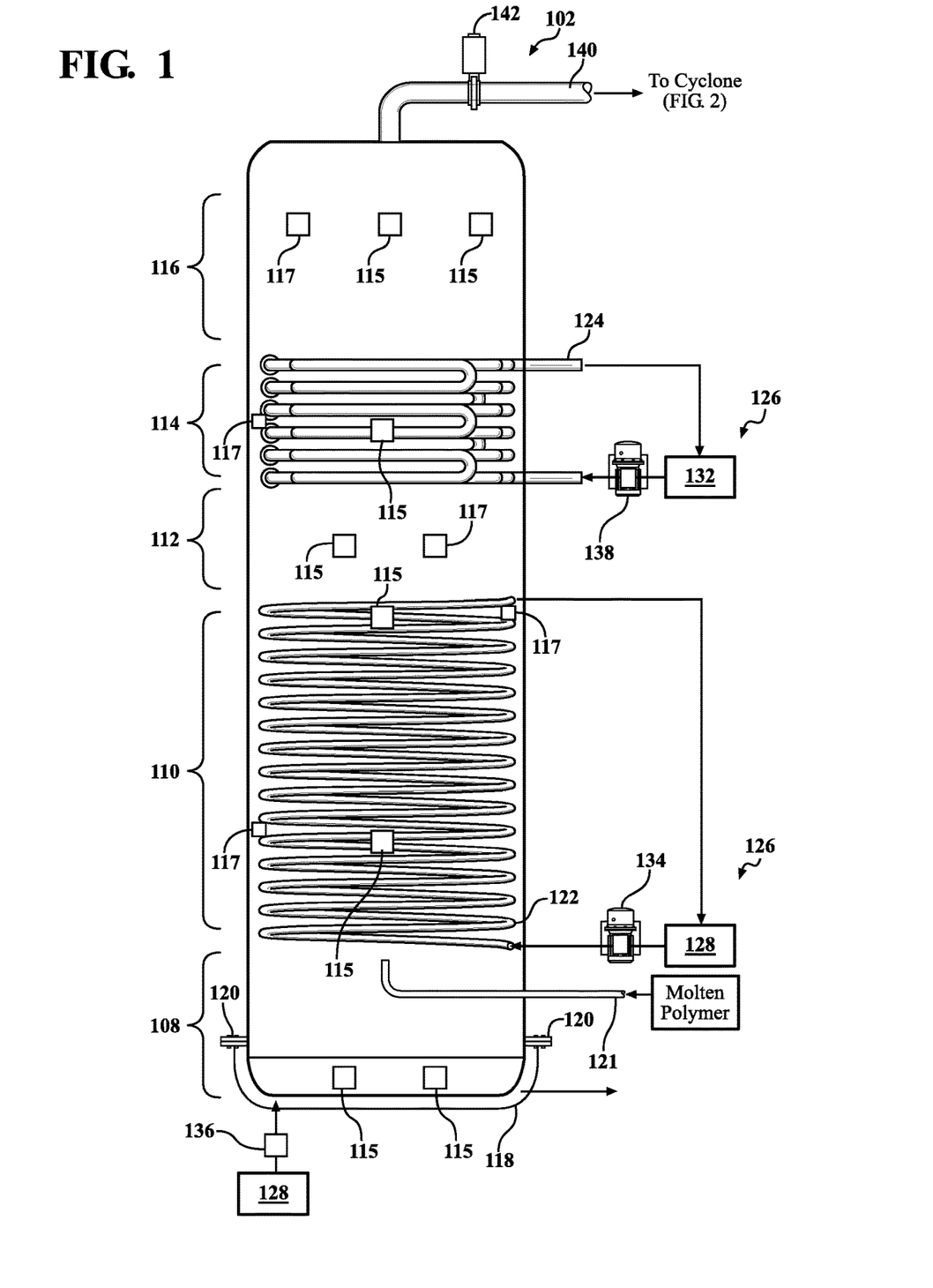
FIG. 1 is a schematic view of a continuous reflux reactor of the thermochemical system for treatment of plastic waste, according to one embodiment of the present disclosure.

With reference to FIG. 1, the continuous reflux reactor 102 may have a plurality of separate zones. In particular embodiments, the continuous reflux reactor 102 may have five separate zones, which may be disposed in series along a length of the continuous reflux reactor 102. Most particularly, the five zones may be a bottom zone 108, a pyrolysis zone 110, a meeting zone 112, a reflux zone 114, and an extraction zone 116, which may be disposed in series from a bottom portion of the continuous reflux reactor 102 to a top portion of the continuous reflux reactor 102. Advantageously, the continuous reflux reactor 102 may be configured to receive melt polymer, to gasify the melt polymer, and to separate desirable relatively light gasified hydrocarbons from undesirable relatively heavy gasified hydrocarbons.

It should be appreciated that the continuous reflux reactor 102 may include a plurality of temperature sensors 115 and a plurality of pressure sensors 117 disposed therein. The temperature sensors 115 and pressure sensors 117 may be configured to monitor the reaction conditions of the continuous reflux reactor 102, in operation.

It should be appreciated that the terms "light hydrocarbons" and "heavy hydrocarbons" define the hydrocarbons in relation to one another. As the melt polymer is gasified, hydrocarbons of various sizes may be produce. Whether a hydrocarbon is a light hydrocarbon or a heavy hydrocarbon may be determined according to a molecular weight and an evaporation temperature of the hydrocarbon. Heavy hydrocarbons may have a larger molecular weight and a higher evaporation temperature than those of the light hydrocarbons. Thus, light hydrocarbons may require less time in the continuous reflux reactor 102, whereas the heavier hydrocarbons may need to be repeatedly gasified until the heavy hydrocarbons are decomposed into light hydrocarbons.

The bottom zone 108 may be enveloped or surrounded with a bottom tube 118 filled with a heating element. In particular embodiments, the heating element may be molten salt. The bottom tube 118 of the bottom zone 108 may have a pair of flanges 120. Each of the pair of flanges 120 may be disposed on an end of the bottom tube 118. The pair of flanges 120 may improve a cleaning process of the continuous reflux reactor 102. In operation, the heavy hydrocarbons together with any other contaminants or residues may fall to the bottom zone 108 where the heavy hydrocarbons may be heated by the bottom tube 118.

The bottom zone 108 may also include a pair of temperature sensors 115. The temperature sensors 115 may monitor the temperature of the bottom zone 108, in operation. A skilled artisan may select another suitable quantity of temperature sensors 115 for the bottom zone 108, as desired.

A feed pipe 121 may be disposed between the bottom zone 108 and the pyrolysis zone 110. The feed pipe 121 may be configured to provide the melt polymer to the continuous reflux reactor 102. The melt polymer may be provided to the feed pipe 121 via a polymer pump (not shown). The melt polymer may thereby be pumped to the pyrolysis zone 110 by the feed pipe 121 and polymer pump.

With continued reference to FIG. 1, the pyrolysis zone 110 may be configured to pyrolyze the melt polymer. In particular embodiments, the pyrolysis zone 110 may have a pyrolysis tube 122 disposed therein. The pyrolysis tube 122 may be a coiled tube as shown in FIG. 1, as a non-limiting example. Other suitable shapes and arrangements for the pyrolysis tube 122 may be utilized by a skilled artisan.

The pyrolysis tube 122 may be filled with a heating element such as molten salt, as a non-limiting example. The molten salt may be present at a temperature up to 500° C. Other suitable types of heating elements may also be employed within the scope of the present disclosure.

The pyrolysis zone 110 may contain two temperature sensors 115 and two pressure sensors 117. One of the temperature sensors 115 and one of the pressure sensors 117 may be disposed adjacent to a bottom portion of the pyrolysis zone 110. The other temperature sensor 115 and the other pressure sensor may be disposed adjacent to a top portion of the pyrolysis zone 110, for example, as shown in FIG. 1.

It should be appreciated that a mass of melt polymer to be added to the continuous reactor should not exceed a height of the pyrolysis tube 122. The addition of melt polymer may be controlled by a load cell. The load cell may be a force transducer, which may be configured to measure a force exerted by the solid waste plastic material. The force may be used to calculate a mass of material inside the continuous reflux reactor 102. With the calculated mass of material in the continuous reflux reactor 102 and a known density of material, the volume of material inside the continuous reflux reactor 102 may be calculated. A skilled artisan may use other suitable methods of measuring the volume of material in the continuous reflux reactor 102, as desired.

In operation, the melt polymer may be pyrolyzed or gasified where it contacts the pyrolysis tube 122 resulting in a hydrocarbon gas containing the light hydrocarbons and the heavy hydrocarbons. The light hydrocarbons may rise from the pyrolysis zone 110, through the meeting zone 112 and reflux zone 114, to the extraction zone 116. The pyrolysis zone 110 may have a pressure which is larger than a pressure of the top portion of the continuous reflux reactor 102. Thus, the light hydrocarbons may be driven from the pyrolysis zone 110 to the top portion of the continuous reflux reactor 102 because of a pressure differential between the zones. The heavy hydrocarbons may fall to the bottom zone 108 together with any other contaminants or residues.

The reflux zone 114 may have a studded tube 124. The studded tube 124 may be a coiled tube as shown in FIG. 1, as a non-limiting example. Other suitable shapes and arrangements for the studded tube 124 may be utilized by a skilled artisan.

The studded tube 124 may be filled with a heating element such as molten salt, as a non-limiting example. The molten salt of the studded tube 124 may be present at a temperature that is lower than the temperature of the pyrolysis tube 122. Where the hydrocarbon gas contacts the relatively cooler studded tube 124, the heavy hydrocarbons will condense and the light hydrocarbons may rise to the extraction zone 116. It should be appreciated that the studded tube 124 provides a larger surface area for the hydrocarbon gas to contact compared to a tube without studs. Thus, the studded tube 124 improves an efficacy of the reflux reaction.

The condensed heavy hydrocarbons may then fall back down to the pyrolysis zone 110 where the heavy hydrocarbons will be pyrolyzed into light hydrocarbons. Advantageously, the continuous reflux reactor 102 is configured to repeatedly reflux the heavy hydrocarbons until the desired light hydrocarbons have been formed. Thus, the continuous reflux reactor 102 allows for a more efficient system for thermochemical treatment of plastic waste 100.

It is of particular importance that a temperature of the reflux zone 114 be monitored and controlled. The temperature control militates against passage of the heavy hydrocarbons to the extraction zone 116. Accordingly, the reflux zone 114 may have two temperature sensors 115. Advantageously, the temperature control of the reflux zone 114 improves the ability of the continuous reflux reactor 102 to perform a secondary pyrolysis reaction to form the light hydrocarbons, as described hereinabove.

In operation, there is an energy exchange between an upward flow of light hydrocarbons toward the top portion of the continuous reflux reactor 102 and a downward flow of the heavy hydrocarbons. The energy exchange improves the reflux reaction. This energy exchange may occur in the meeting zone 112. The meeting zone 112 may have one temperature sensor 115 and one pressure sensor 117 to monitor the reaction conditions in the meeting zone 112.

As described hereinabove, each of the bottom zone 108, the pyrolysis zone 110, and the reflux zone 114 contain a heating element, which in certain embodiments is molten salt. The molten salt may be provided by a molten salt system 126. The molten salt system 126 may include two parts, namely a hot salt system 128 and a cold salt system 130. The hot salt system 128 may provide the molten salt for the bottom zone 108 and the pyrolysis zone 110. The cold salt system 130 may provide the molten salt to the reflux zone 114.

The hot salt system 128 may have two pumps 132. A first pump 134 of the pumps 132 provides the molten salt for the pyrolysis tube 122 of the pyrolysis zone 110, and a second pump 136 provides the molten salt for the bottom tube 118 of the bottom zone 108. The cold salt system 130 may have a cold pump 138. The cold pump 138 may provide the cold molten salt to the studded tube 124 of the reflux zone 114. Each of the first pump 134, the second pump 136, and the cold pump 138 may have an inverter. Advantageously, the inverter allows for variation of the flow rate according to any process requirements.

The remaining hydrocarbon gas containing the light hydrocarbons may pass through the reflux zone 114 into the extraction zone 116. The extraction zone 116 may have two temperature sensors 115 to control a temperature of the hydrocarbon gas.

The continuous reflux reactor 102 may be connected to the cyclone 104 via a pipe 140. The pipe 140 may have a flux valve 142. The flux valve 142 may be located adjacent to the cyclone 104 to militate against condensation through the pipe 140. The flux valve 142 allows for control of an internal pressure in the continuous reflux reactor 102 and an expansion of the hydrocarbon gas that occurs as the hydrocarbon gas passes through the pipe 140. The pipe 140 may have a pressure sensor 117 disposed after the flux valve 142 to control the expansion of the hydrocarbon gas in the pipe 140.

Figure 2:
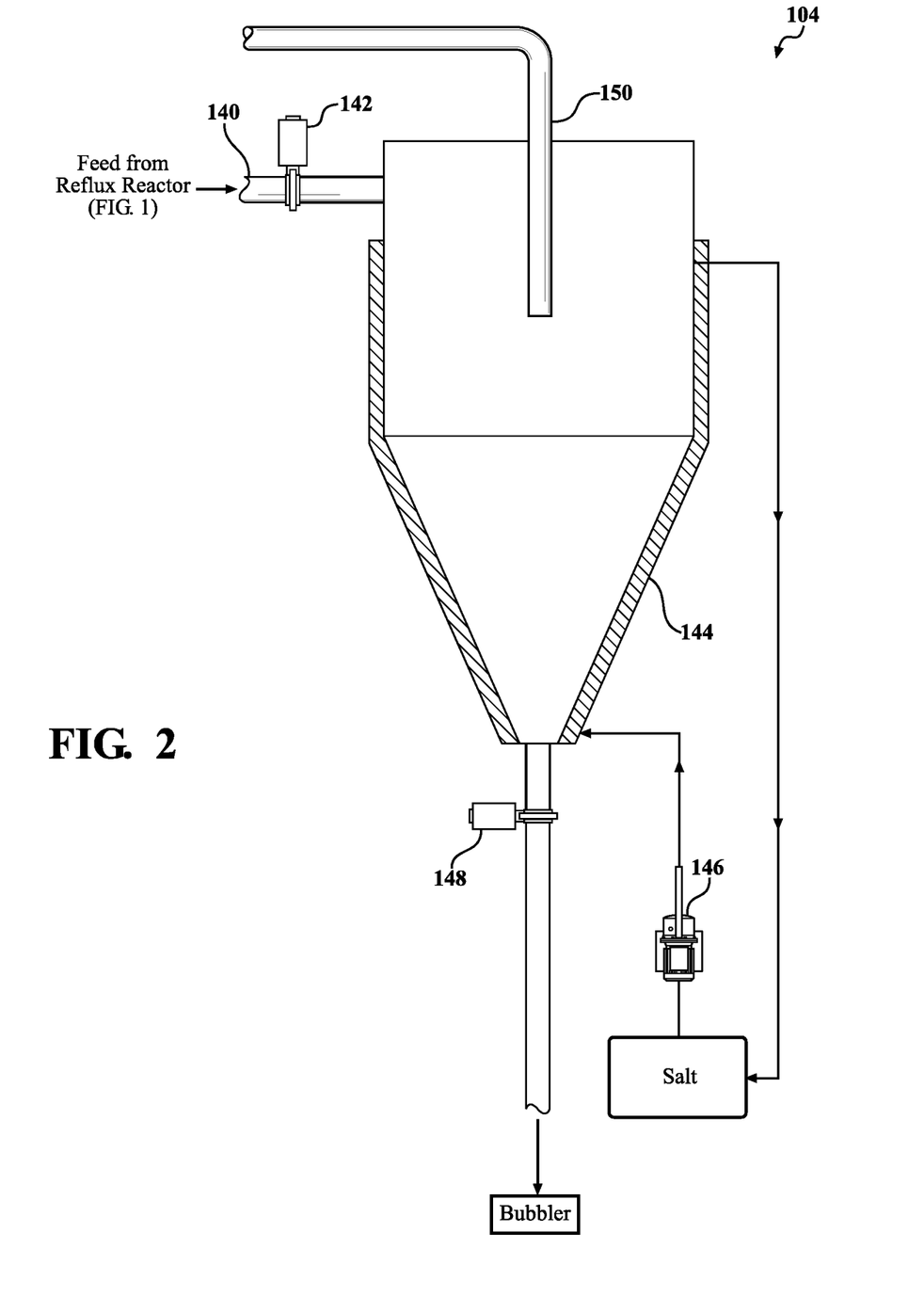
FIG. 2 is a schematic view of a cyclone of for thermochemical system for treatment of plastic waste, according to one embodiment of the present disclosure.

With reference to FIG. 2, the cyclone 104 is shown. Advantageously, the cyclone 104 enables the acquisition of a higher percentage of naphtha from the hydrocarbon gas. The cyclone 104 also militates against undesirable heavy hydrocarbons from passing through to the condenser system 106 by allowing for condensation of the heavy hydrocarbons in the cyclone 104 during the condensation.

The cyclone 104 may have a jacket 144. The jacket 144 may be filled with a heating element. The heating element may be molten salt as a non-limiting example. The molten salt enters the jacket 144 through a pump 146. The pump 146 may be equipped with an inverter, which allows for control of a salt flow. Advantageously, controlling the salt flow allows for control of a pressure and a temperature of the cyclone 104.

The molten salt of the jacket 144 may have a temperature. The temperature may allow for condensation of the heavy hydrocarbons that may have passed from the continuous reflux reactor 102. The condensed heavy hydrocarbons and other remaining small particulates may fall to a bottom portion of the cyclone 104. The bottom portion of the cyclone 104 may have a temperature sensor 115.

In the bottom portion of the cyclone 104, the small particulates and the heavy hydrocarbons may be retained until a pre-defined temperature is reached. Where the pre-determined temperature is detected by the temperature sensor 115, a drain valve 148 may be automatically opened. The drain valve 148 may be a pressure valve, as a non-limiting example. The drain valve 148 may be programmed to open for a pre-determined time. The remaining small particulates that fall to the drain valve 148 may go to the bubbler (not shown) by means of pressure difference.

The hydrocarbon gas may be directed, by means of a pressure difference to a pipe 150 in a top portion of the cyclone 104. The pipe 150 may connect the cyclone 104 and the condenser system 106. The pipe 150 may include one temperature sensor 115 and one pressure sensor 117.

Figure 3:
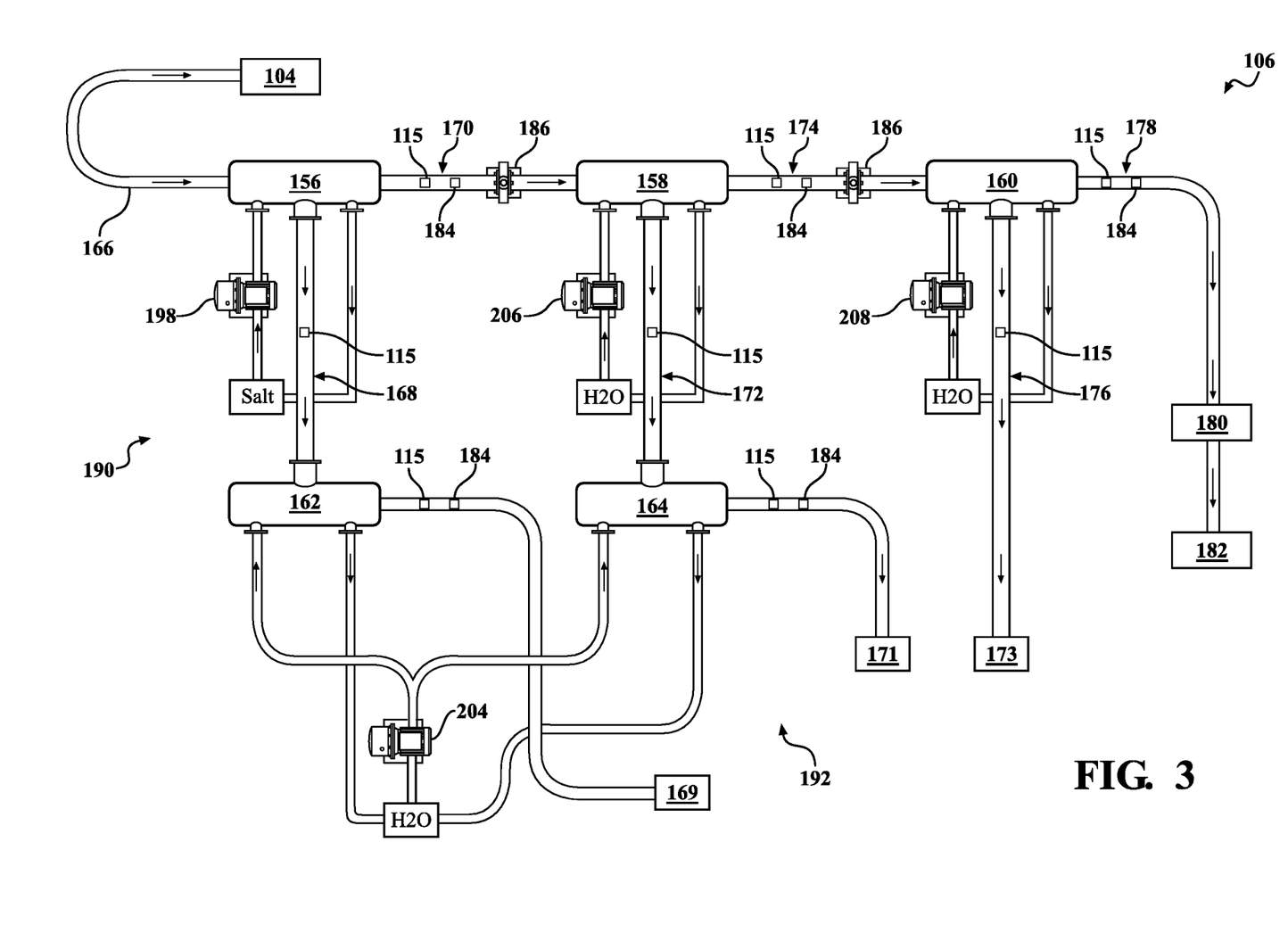
FIG. 3 is a schematic view of a condenser of the system for thermochemical system for treatment of plastic waste, according to one embodiment of the present disclosure.

With reference to FIG. 3, the condenser system 106 is shown. The condenser system 106 receives the gases from the cyclone 104. The condenser system 106 may include a plurality of condensers, which may be divided in two groups, namely, primary condensers 152 and the secondary condensers 154. The primary condensers 152 include a heavy oil condenser 156, a heavy naphtha condenser 158, and a light naphtha condenser 160. The secondary condensers 154 include a secondary heavy oil condenser 162 and a secondary heavy naphtha condenser 164. The primary condensers 152 and the secondary condensers 154 may be used to cool the hydrocarbon gas for storage.

The heavy oil condenser 156 receives the hydrocarbon gases from the cyclone 104 via an inlet line 166. The heavy oil condenser 156 may cool the hydrocarbon gas using a cooling element. The cooling element may be molten salt, as a non-limiting example. The hydrocarbon gas may be cooled to a temperature of approximately 200° C., where a portion of the hydrocarbon gas may condense. The condensed portion from the heavy oil condenser 156 may be directed to the secondary heavy oil condenser 162 via a first liquid line 170. The secondary heavy oil condenser 162 may cool the condensed portion using a cooling element. The cooling element may be water, as a non-limiting example. The cooled, condensed portion may then be pumped to a silo 169 for storage.

The hydrocarbon gas of the heavy oil condenser 156 may be directed to the heavy naphtha condenser 158 via a first gas outlet line 170. The heavy naphtha condenser 158 may cool the hydrocarbon gas to a temperature of approximately 90° C., where a fraction of the hydrocarbon gas will condense. The condensed fraction may be directed to the secondary heavy naphtha condenser 164 via a second liquid outlet line 172. The secondary heavy naphtha condenser 164 may cool the condensed fraction using a cooling element. The cooling element may be water, as a non-limiting example. The cooled, condensed fraction may then be pumped to a silo 171 for storage.

The hydrocarbon gas from the heavy naphtha condenser 158 may be directed to the light naphtha condenser 160 via a second gas outlet line 174. The light naphtha condenser 160 may cool the hydrocarbon gas to a temperature of about 30° C., where a portion of the hydrocarbon gas may condense. The condensed hydrocarbon gas may be directed a silo 173 via a third liquid outlet line 176.

Any remaining gases in the light naphtha condenser 160 may be non-condensable gases. The non-condensable gases may be directed via a third gas outlet line 178 to a bubbler 180 for washing. The remaining fractions from the bubbler 180 may be directed to a burner 182.

Each of the first gas outlet line 170, the second gas outlet line 174, and the third gas outlet 178 may have one of the temperature sensors 115 and a flux sensor 184. Each of the first liquid outlet line 168, the second liquid outlet line 172, and the third liquid outlet line 176 may be equipped with one of the temperature sensors 115. Each of the secondary condensers 154 may also include one of the temperature sensors 115 and one of the flux sensors 184. The temperature sensors 115 and the flux sensors 184 may monitor the expansion of gas within the condenser system 106.

Each of the first gas outlet line 170 and the second gas outlet line 174 may have a flux valve 186. The flux valves 186 allow for pressure control within the outlet lines 170, 174. Control of the internal pressure of the gases allows for obtaining oils with a higher purity than in systems without flux valves 186.

Figure 4:
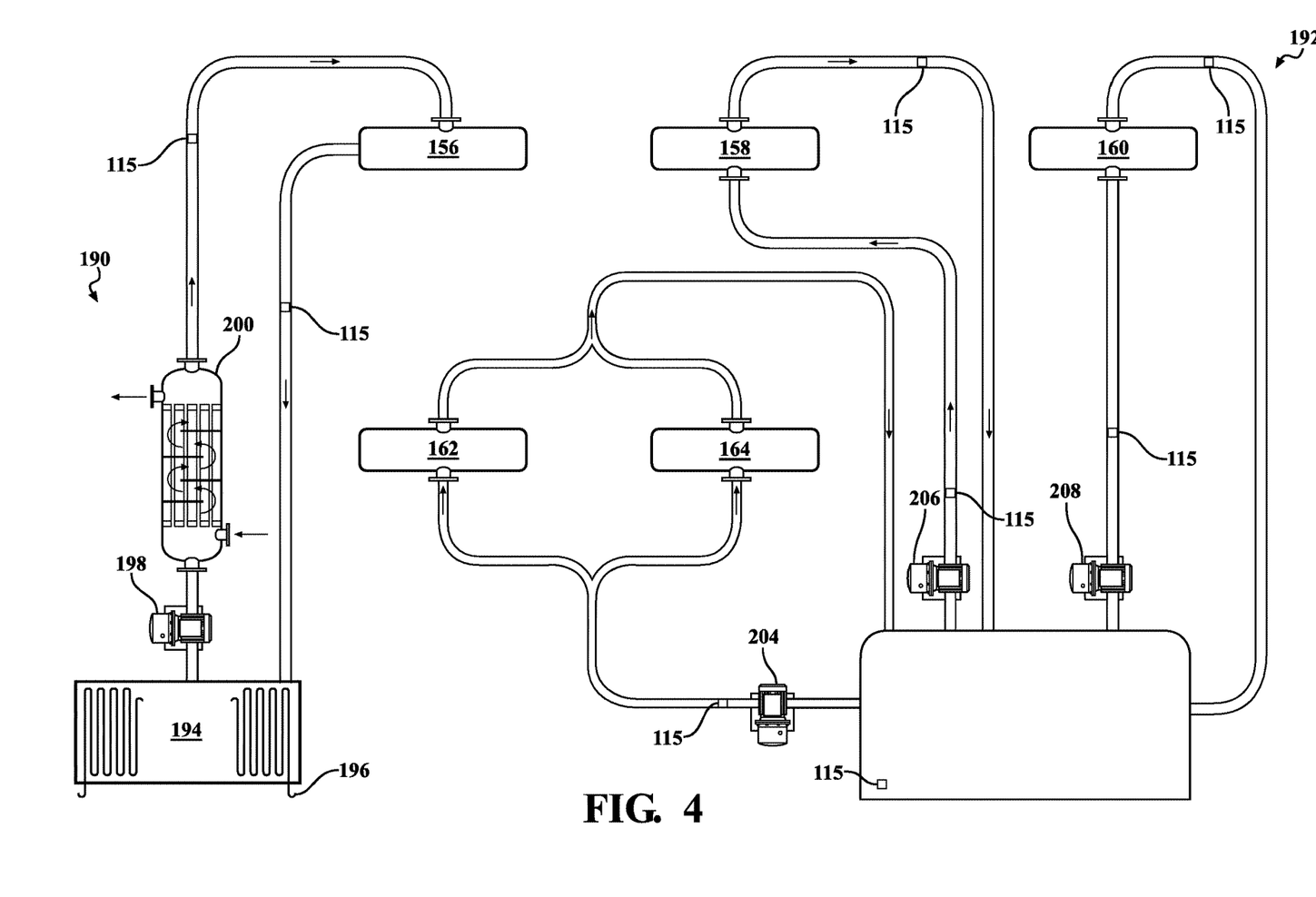
FIG. 4 is a schematic view of a refrigeration system of for thermochemical system for treatment of plastic waste, according to one embodiment of the present disclosure.

With reference to FIG. 4, the cooling elements for the primary condensers 152 and the secondary condensers 154 may be provided via a cooling system 188. The cooling system 188 may include a molten salt refrigeration system 190 and a water refrigeration system 192. The molten salt refrigeration system 190 may provide the molten salt to the heavy oil condenser 156. The water refrigeration system 192 may provide water to the heavy naphtha condenser 158, the light naphtha condenser 160, the secondary heavy oil condenser 162, and the secondary heavy naphtha condenser 164. Advantageously, the cooling system 188 allows for the controlled condensation of the hydrocarbon gas. A skilled artisan may select other suitable cooling elements, as desired.

The molten salt refrigeration system 190 may include a salt tank 194. The salt tank 194 may have an electric heater 196, which is configured to heat the molten salt within the salt tank 194. The salt tank 194 may also include one of the temperature sensors 115. A salt pump 198 may direct the molten salt from the salt tank 194 to an air cooler 200. The salt pump 198 may have an inverter, which allows for control of a salt flow. The air cooler 200 may be configured to cool the molten salt to a temperature below 200° C. The salt may be pumped from the air cooler 200 to the heavy oil condenser 156. The salt allows for the condensation inside the heavy oil condenser 156 via a heat exchange between the hydrocarbon gas and the molten salt. The salt may then flow back to the salt tank 194.

One of the temperature sensors 115 may be disposed between the air cooler 200 and the heavy oil condenser 156. Another temperature sensor 115 may be disposed between the heavy oil condenser 156 and the salt tank 194. Advantageously, the temperature sensors 115 may allow for control of the molten salt within the molten salt refrigeration system 190.

The water refrigeration system 192 may include a water chiller 202. The water chiller 202 may have one of the temperature sensors 115. The water chiller 202 may provide water at a temperature around 25° C. The water chiller 202 may include a plurality of pumps 204, 206, 208. Each of the pumps 204, 206, 208 may have an inverter. It should be appreciated that the use of pumps with an inverter is important because the inverter controls the temperature, since it allows for control of the cooling element flow.

Each of the pumps 204, 206, 208 may have an exit stream with one of the temperature sensors 115 to control the temperature of the water returning to the water chiller 202. The plurality of pumps 204, 206, 208 may include one pump 204 for the secondary heavy oil condenser 162 and the secondary heavy naphtha condenser 164, one pump 206 for the heavy naphtha condenser 158, and one pump 208 for the light naphtha condenser 160. The water may be pumped to each of the heavy naphtha condenser 158, the light naphtha condenser 160, the secondary heavy oil condenser 162, and the secondary heavy naphtha condenser 164 where a heat exchange occurs allowing for the condensation reaction to occur.

Figure 5:
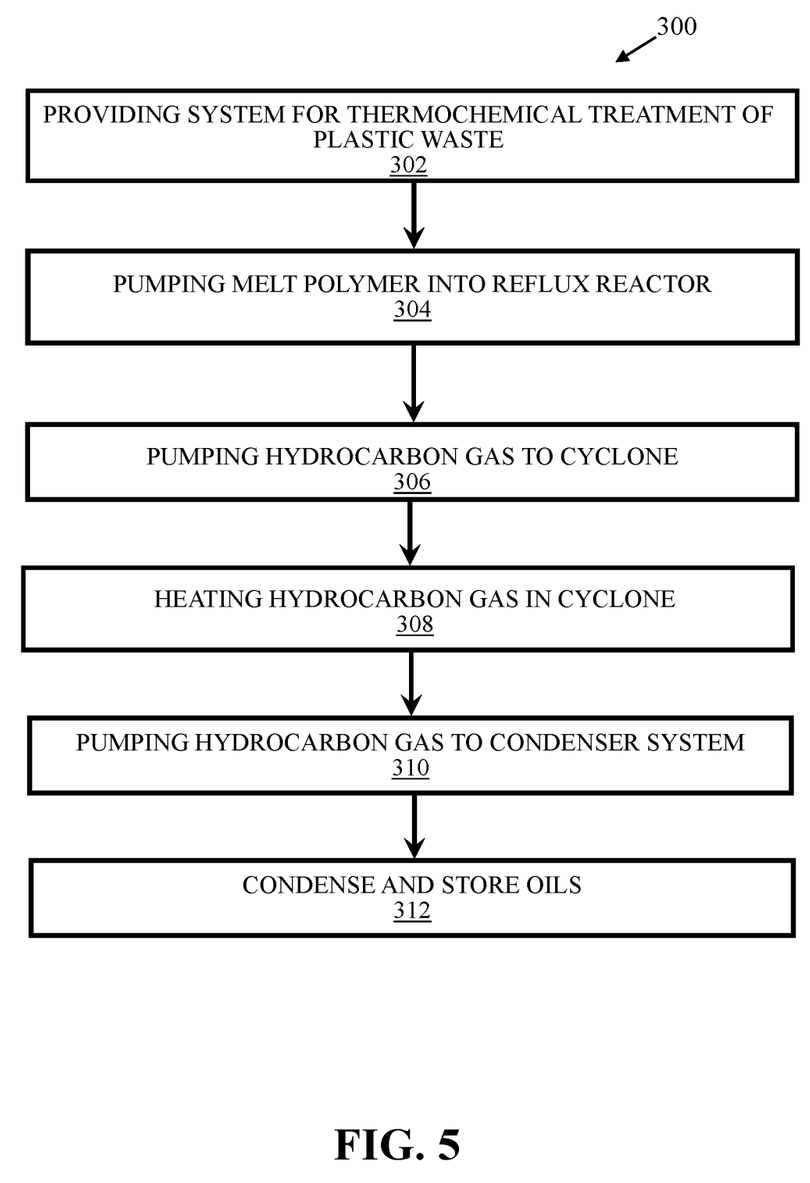
FIG. 5 is a flow chart illustrating a method of thermochemical treatment of plastic waste, according to a further embodiment of the present disclosure.

The continuous reflux reactor 102, the cyclone 104, and the condenser system 106 may be in communication with a control unit. The control unit may include a computer having a processor and a memory with non-transitory processor-executable instructions tangibly embodied thereon. The control unit may further have a human interface such as a touchscreen or manual controls that permits an operator to operate the system 100. In particular, the control unit may be configured to execute a method 300 of the present disclosure, for example, as shown in FIG. 5 and described hereinbelow. One skilled in the art may select other suitable types of control units within the scope of the present disclosure.

It should be appreciated that the control unit may be configured to monitor the system 100, such that the control unit may be configured to send and receive signals at pre-determined locations throughout the system 100.

The control unit may receive signals from the temperature sensors 115, the pressure sensors 117, and the flux sensors 184. In order to adjust the flux accordingly to a pre-determined value, the control system sends a signal to one of the reactor 102, the cyclone 104, or the condenser system 106 to adjust the temperature or pressure of a determined stream, which will correct the parameters and adjusting the fluxes.

The present disclosure includes the method 300 of thermochemical treatment of plastic waste, for example, as shown in FIG. 5. A first step 302 in the method 300 may be providing the system for thermochemical treatment of plastic waste 100, as described hereinabove.

A second step 304 in the method 300 may be pumping melt polymer into the continuous reflux reactor 102. In the continuous reflux reactor 102, the melt polymer may be pyrolyzed and refluxed to form the hydrocarbon gas.

The method 300 has a third step 306 of pumping the hydrocarbon gas from the continuous reflux reactor 102 to the cyclone 104. In the cyclone 104, the hydrocarbon gas may be further refined to remove the heavy hydrocarbons. A fourth step 308 in the method 300 may be heating and pressurizing the hydrocarbon gas within the cyclone 104.

A fifth step 310 of the method 300 is pumping the gas out of the cyclone 104 to the condenser system 106. In the condenser system 106, the gas may flow through the primary condensers 152, while the controlled condensation reaction causes liquids to condense out of the gas. The condensation may be performed via the heat exchange between the hydrocarbon gas and the cooling elements provided by the cooling system 188.

The method 300 may have a sixth step 312 of cooling and storing the oils. The condensed portions may be further cooled by the secondary condensers 154 before being stored in the silos 169, 171, 173.

Advantageously, the system 100 and method 300 for thermochemical treatment of plastic waste and/or elastomeric waste of the present disclosure is an efficient and safe continuous reflux reactor and controlled condenser system for thermochemical treatment of plastic and/or elastomeric waste, which may obtain higher percentages of naphtha.

It should be appreciated that the reactor 102 houses both a pyrolysis zone 110 and a reflux zone 114. This combination of zones allows for a continuous pyrolysis reaction militating against heavy hydrocarbons undesirably exiting the reactor 102. Accordingly, pyrolysis and reflux will continually be occurring in the reactor until the hydrocarbons are the desirable weight to proceed through the system.

While certain representative embodiments and details have been shown for purposes of illustrating the invention, it will be apparent to those skilled in the art that various changes may be made without departing from the scope of the disclosure, which is further described in the following appended claims.

What is claimed is:

1. A system for thermochemical treatment of plastic waste, comprising:
   a continuous reflux reactor configured to receive and pyrolyze melt polymer to form gasified hydrocarbons, the gasified hydrocarbons including heavy hydrocarbons and light hydrocarbons, the continuous reflux reactor configured to reflux the heavy hydrocarbons and produce refluxed hydrocarbons;
   a cyclone in fluid communication with the continuous reflux reactor and configured to receive the refluxed hydrocarbons from the continuous reflux reactor, the cyclone configured to refine the refluxed hydrocarbons by condensing heavy hydrocarbons to produce refined hydrocarbons; and
   a condenser system in fluid communication with the cyclone and configured to receive the refined hydrocarbons from the cyclone, the condenser system configured to perform a controlled condensation of the refined hydrocarbons to produce separate oils.

2. The system for thermochemical treatment of plastic waste of claim 1, wherein the continuous reflux reactor has a bottom zone, a pyrolysis zone, a meeting zone, a reflux zone, and an extraction zone, disposed in series from a first end to a second end of the reactor, the bottom zone configured to include a portion of the melt polymer, the pyrolysis zone configured to pyrolyze the melt polymer, the meeting zone configured to provide for an upward flow of light hydrocarbons from the pyrolysis zone and a downward flow of heavy hydrocarbons from the reflux zone, the reflux zone configured to condense heavy hydrocarbons and allow light hydrocarbons to pass to the extraction zone, and the extraction zone configured to include the refluxed hydrocarbons.

3. The system for thermochemical treatment of plastic waste of claim 2, wherein each of the bottom zone, the pyrolysis zone, the meeting zone, the reflux zone, the extraction zone has at least one temperature sensor disposed therein.

4. The system for thermochemical treatment of plastic waste of claim 2, wherein the bottom zone has a feed pipe configured to transport the melt polymer to the continuous reflux reactor.

5. The system for thermochemical treatment of plastic waste of claim 2, wherein the bottom zone has a tube filled with a heating element configured to heat the bottom zone.

6. The system for thermochemical treatment of plastic waste of claim 2, wherein the pyrolysis zone has a tube filled with a heating element configured to heat the pyrolysis zone.

7. The system for thermochemical treatment of plastic waste of claim 2, wherein the reflux zone has at least one studded tube filled with a heating element.

8. The system for thermochemical treatment of plastic waste of claim 7, wherein the heating element is molten salt.

9. The system for thermochemical treatment of plastic waste of claim 1, wherein the cyclone has a jacket configured to heat the cyclone.

10. The system for thermochemical treatment of plastic waste of claim 9, wherein the jacket is filled with molten salt provided via a molten salt storage unit.

11. The system for thermochemical treatment of plastic waste of claim 10, wherein the molten salt storage unit has a pump with an inverter.

12. The system for thermochemical treatment of plastic waste of claim 1, wherein the cyclone has a drain valve with a temperature sensor.

13. The system for thermochemical treatment of plastic waste of claim 1, wherein the cyclone has an exit pipe with a pressure sensor and a temperature sensor.

14. The system for thermochemical treatment of plastic waste of claim 1, where in the condenser system includes a heavy oil condenser, a heavy naphtha condenser, a light naphtha condenser, a secondary heavy oil condenser, a secondary heavy naphtha condenser.

15. The system for thermochemical treatment of plastic waste of claim 14, wherein at least one sensor is disposed adjacent to each of the heavy oil condenser, the heavy naphtha condenser, the light naphtha condenser, the secondary heavy oil condenser, the secondary heavy naphtha condenser.

16. The system for thermochemical treatment of plastic waste of claim 15, wherein the heavy oil condenser is cooled via a molten salt refrigeration system, which includes a salt tank and an electric heater.

17. The system for thermochemical treatment of plastic waste of claim 16, wherein at least one sensor is disposed within the salt tank.

18. The system for thermochemical treatment of plastic waste of claim 14, wherein each of the heavy naphtha condenser, the light naphtha condenser, the secondary heavy naphtha condenser, and the secondary heavy oil condenser are cooled via a refrigeration system, which includes a water chiller and an air cooler.

19. The system for thermochemical treatment of plastic waste of claim 18, wherein at least one sensor is disposed within each of the water chiller, and the air cooler.

* * * * *